(12) United States Patent
Hanneken et al.

(10) Patent No.: US 8,307,874 B1
(45) Date of Patent: Nov. 13, 2012

(54) TIRE CHANGING METHOD AND MACHINE WITH ANGULARLY POSITIONABLE DRIVE AXIS

(75) Inventors: Douglas S. Hanneken, St. Louis, MO (US); Michael D. Gerdes, St. Peters, MO (US)

(73) Assignee: Hunter Engineering Company, Bridgeton, MO (US)

( * ) Notice: Subject to any disclaimer, the term of this patent is extended or adjusted under 35 U.S.C. 154(b) by 135 days.

(21) Appl. No.: 12/358,760

(22) Filed: Jan. 23, 2009

Related U.S. Application Data

(60) Provisional application No. 61/023,762, filed on Jan. 25, 2008.

(51) Int. Cl.
*B60C 25/132* (2006.01)

(52) U.S. Cl. .......................... 157/19; 157/1.24

(58) Field of Classification Search ............... 157/1.24, 157/1.28, 1, 1.17, 14–21
See application file for complete search history.

(56) References Cited

U.S. PATENT DOCUMENTS

| | | | |
|---|---|---|---|
| 2,349,552 A * | 5/1944 | Holmes ..................... 157/19 |
| 3,168,130 A * | 2/1965 | Turpin ..................... 157/1.28 |
| 3,511,296 A | 5/1970 | Houston et al. |
| 3,722,570 A | 3/1973 | McKenney |
| 4,093,006 A | 6/1978 | Hessels |
| 4,299,265 A | 11/1981 | Alm |
| 4,393,914 A | 7/1983 | Leeper |
| 4,424,848 A | 1/1984 | Gore et al. |
| 4,433,578 A | 2/1984 | Hill |
| 4,529,024 A | 7/1985 | Vijay |
| 4,549,595 A | 10/1985 | Kemper |
| D293,916 S | 1/1988 | Cunningham et al. |
| 4,750,538 A | 6/1988 | du Quesne |
| 4,768,909 A | 9/1988 | Warkotsch |
| 5,050,659 A | 9/1991 | Scalambra |
| 5,088,539 A * | 2/1992 | Mannen et al. ............. 157/1.17 |
| 5,219,012 A * | 6/1993 | Corghi ..................... 157/19 |
| 5,226,465 A | 7/1993 | Schon et al. |
| 5,332,020 A | 7/1994 | Brunner |
| 5,615,574 A | 4/1997 | Drechsler et al. |
| 5,752,555 A | 5/1998 | Cunningham et al. |
| 5,921,304 A | 7/1999 | Nipper |
| 6,039,104 A | 3/2000 | Cunningham et al. |
| 6,056,034 A | 5/2000 | Matnick |
| 6,062,289 A | 5/2000 | Cunningham et al. |
| 6,109,327 A * | 8/2000 | Gonzaga ..................... 157/1.28 |
| 6,240,995 B1 | 6/2001 | Corghi |
| 6,276,422 B1 | 8/2001 | Rino |
| 6,481,281 B1 | 11/2002 | Gerdes |
| 6,516,855 B2 | 2/2003 | Corghi |
| 6,854,194 B2 | 2/2005 | Hansen |

(Continued)

FOREIGN PATENT DOCUMENTS

EP 0001855 A1 6/1979

(Continued)

*Primary Examiner* — Hadi Shakeri
(74) *Attorney, Agent, or Firm* — Armstrong Teasdale LLP

(57) ABSTRACT

Methods and machines for changing tires on a wheel rim are disclosed. The machine includes a drive shaft having a drive axis that can positioned at different angles for convenience of the machine operator to mount a variety of differently-sized wheel rims to the drive shaft without undue lifting and handling of the wheel rims.

21 Claims, 11 Drawing Sheets

U.S. PATENT DOCUMENTS

| | | |
|---|---|---|
| 6,916,026 B2 | 7/2005 | Meza |
| 7,010,975 B2 | 3/2006 | Oppermann et al. |
| 7,048,026 B2 | 5/2006 | Bonacini |
| 7,128,119 B2 | 10/2006 | Corghi |
| 7,143,801 B2 | 12/2006 | Matteucci |
| 7,159,633 B2 | 1/2007 | Nemish |
| 7,201,203 B2 | 4/2007 | Rogalla et al. |
| 7,201,204 B2 | 4/2007 | Corghi et al. |
| 7,404,427 B2 * | 7/2008 | Hillman et al. .................. 157/1 |
| 2002/0046814 A1 * | 4/2002 | Vignoli ...................... 157/1.28 |
| 2006/0266481 A1 | 11/2006 | Gonzaga |
| 2007/0006976 A1 | 1/2007 | Gonzaga |
| 2007/0144681 A1 | 6/2007 | Cunningham |
| 2007/0158033 A1 | 7/2007 | Cunningham |

FOREIGN PATENT DOCUMENTS

| | | |
|---|---|---|
| EP | 0032759 A3 | 7/1981 |
| EP | 0008822 B1 | 4/1982 |
| EP | 0167195 A2 | 1/1986 |
| EP | 0849102 B1 | 6/1998 |
| EP | 0891882 A2 | 1/1999 |
| EP | 1044830 A1 | 10/2000 |
| EP | 1157860 B1 | 11/2001 |
| EP | 1157861 A2 | 11/2001 |
| EP | 0947360 B1 | 6/2003 |
| EP | 1518718 A1 | 3/2005 |
| EP | 1591280 A1 | 11/2005 |
| EP | 1612064 A1 | 1/2006 |
| EP | 1683658 A2 | 7/2006 |
| EP | 1724125 A1 | 11/2006 |

* cited by examiner

TIRE CHANGING METHOD AND MACHINE WITH ANGULARLY POSITIONABLE DRIVE AXIS

CROSS REFERENCE TO RELATED APPLICATIONS

This application claims the benefit of U.S. Provisional Patent Application Ser. No. 61/023,762 filed Jan. 25, 2008, the complete disclosure of which is hereby incorporated by reference in its entirety.

BACKGROUND OF THE INVENTION

The field of the invention relates generally to machines for changing a tire on a wheel rim, and more specifically to tire changing machines having a selectively positionable drive axis.

The process of removing a tire from a wheel rim and replacing it with another tire, referred to herein as tire changing, can be difficult. In response to such difficulties, machines have been developed to facilitate the tire changing process. The machines commonly include a clamping mechanism and a drive axis that spins the wheel rim about an axis. A tire removal tool, which may be either manually inserted by a machine operator or integrated into the machine itself, is used to pull the bead of the tire off the wheel rim as the wheel rim is spun, allowing the tire to be separated from the rim for removal. Manual or machine implemented tools also are utilized to press the tire onto the wheel rim for installation. While known machines have obtained some level of success in reducing the time and labor associated with changing a tire, there remains room for improvement.

BRIEF DESCRIPTION OF THE INVENTION

Advantageous embodiments of machines for changing tires on a wheel rim are disclosed that provide numerous benefits and improvements over existing tire changing machines.

In one embodiment, a machine for changing a tire on a wheel rim is disclosed. The machine comprises a base and a drive shaft having a proximal end proximate the base, a distal end extending outwardly from the base, and a longitudinal axis extending from the proximal end to the distal end. A motor is coupled to the drive shaft for rotating the drive shaft about the longitudinal axis. At least one element configured to tilt the drive shaft relative to the base at the proximal end is also provided.

Optionally, the element configured to tilt the drive shaft may be operable to position the drive shaft to a wheel rim mounting position at a first angle relative to the base and a tire changing position at a second angle relative to the base, wherein the first and second angles are different from one another. The drive shaft may be oriented substantially vertically in the tire changing position, and the drive shaft may be oriented substantially horizontally in the wheel mounting position. The wheel rim may include a hub mount pad, with the machine further comprising a platen fixed to the distal end of the drive shaft, and the platen configured to engage the hub mounting pad of the wheel rim. The machine may further comprise a mounting spindle removably coupled to the distal end of the drive shaft. The machine may also comprise an adaptor removably coupled to the spindle and engaging the hub mount pad of the wheel rim. Retracting of the drive shaft along the longitudinal axis may clamp the spindle to the hub mount pad and maintain the hub mount pad stationary with respect to the drive shaft. At least one of the motor, the piston and the pivot shaft may be hydraulically actuated. An angle sensor element detecting a tilted position of the element configured to tilt the drive shaft may also be provided, together with a controller having a memory for storing at least one preferred tilted position of the element. A mechanism for extending and retracting the drive shaft relative to the base may also be provided. The element configured to tilt the drive shaft may be a pivot shaft.

Another embodiment of a machine for changing a tire on a wheel rim for a vehicle is also disclosed. The machine comprises a base and a drive shaft having a proximal end proximate the base, a distal end extending outwardly from the base, and a longitudinal axis extending from the proximal end to the distal end. The drive shaft is rotatable about the longitudinal axis, has a mechanism to clamp the wheel, and is pivotable at the proximal end to orient the longitudinal axis at different angles relative to the base Optionally, the machine may further comprise a platen and a removable spindle coupled to the distal end. The machine may comprise a motor for rotating the drive shaft. The machine may comprise at least one pivot shaft for pivoting the drive shaft. The drive shaft may be pivotable to position the drive shaft to a wheel rim mounting position at a first angle relative to the base and a tire changing position at a second angle relative to the base, wherein the first and second angles are different from one another. The drive shaft may be oriented substantially vertically in the tire changing position, and the drive shaft may be oriented substantially horizontally in the wheel mounting position. The wheel rim may include a hub mount pad, and the drive shaft may be retractable to clamp the hub mount pad in a stationary manner relative to the drive shaft. The machine may also comprise a controller configured to retrieve a preferred angle and automatically orient the longitudinal axis at the preferred angle relative to the base. The mechanism to clamp the wheel may include a threaded coupler. The mechanism to clamp the wheel may be automatically actuated by the machine without manual assistance of a machine operator.

In still another embodiment, a machine for changing a tire on a wheel rim for a vehicle is disclosed. The machine comprises a base and a drive shaft having a proximal end proximate the base, a distal end extending outwardly from the base, and a longitudinal axis extending from the proximal end to the distal end. The drive shaft is rotatable about the longitudinal axis, with the drive shaft being selectively positionable between a wheel rim mounting position and a tire changing position that is different from the wheel rim mounting position, whereby the drive shaft lifts and positions the wheel rim from the wheel rim mounting position to the tire changing position.

Optionally, the longitudinal axis may be oriented substantially vertically in the tire changing position. The longitudinal axis may be oriented substantially horizontally in the wheel rim mounting position. The drive shaft may be axially movable between a clamped position and a released position to clamp and release the wheel rim from the drive shaft. The machine may also include a memory wherein a preferred wheel rim mounting position may be stored and retrieved for automatic use by the machine.

A method of changing a tire on a wheel rim for a vehicle is also disclosed. The method utilizes a machine including a base and a drive shaft for rotating the tire about a rotational axis, with the drive shaft positionable in a wheel rim mounting position and a tire changing position. The method comprises: positioning the drive shaft to the wheel rim mounting position; engaging the wheel rim to the drive shaft; and moving the drive shaft to the tire changing position with the wheel rim engaged to the drive shaft, thereby lifting wheel rim from the wheel rim mounting position to the tire changing position.

Optionally, moving the drive shaft may comprise moving the drive shaft to a substantially vertical position. Positioning the drive shaft to the wheel rim may comprise tilting the drive shaft from a substantially vertical orientation to a substantially horizontal orientation. The method may further comprise moving the drive shaft toward the base to clamp the wheel rim in a stationary manner relative to the drive shaft. The machine may also include a memory, with the method further comprising storing a preferred wheel rim mounting position in the memory for later retrieval. The method may further comprise retrieving at least one stored wheel rim mounting position for execution by the machine.

Still further, another embodiment of a machine for changing a tire on a wheel rim for a vehicle is disclosed. The machine comprises a base, means for rotating the wheel rim about a rotational axis, means for pivoting the rotational axis relative the base, and means for displacing the means for rotating toward and away from the base.

Optionally, at least one of the means for rotating, the means for pivoting, and the means for displacing may be hydraulically actuated. The machine may also include means for storing at least one preferred position of the means for pivoting the rotational axis relative the base.

DETAILED DESCRIPTION OF THE INVENTION

Figure 1:
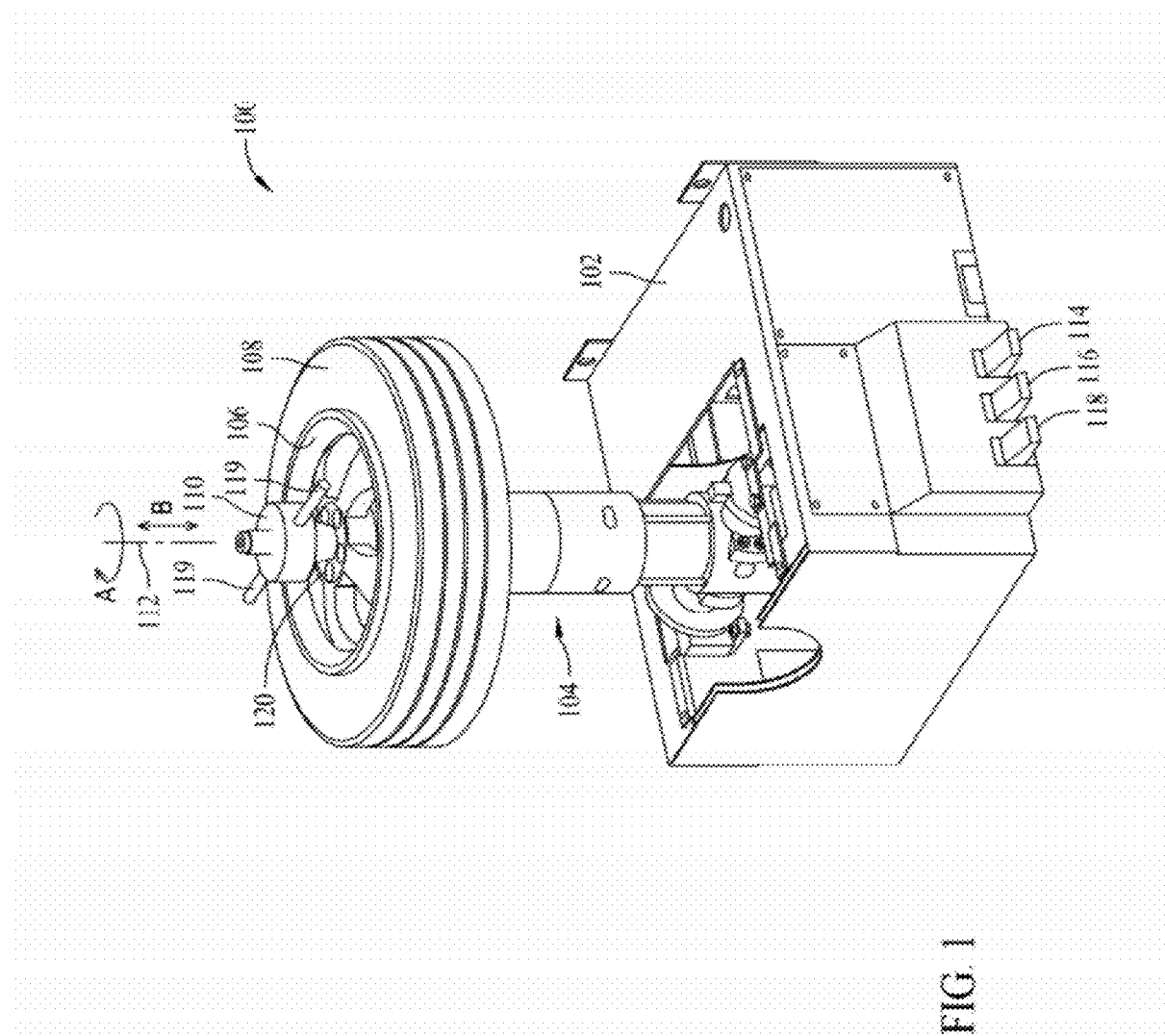
FIG. 1 is a perspective view of an exemplary embodiment of a tire changing machine with a drive shaft assembly in a tire-changing position.

Exemplary embodiments of tire changing machines and methods are described in detail below. The tire changing machines and methods facilitate efficient tire changing with reduced difficulty for machine operators. The machines and methods capably accommodate a large variety of differently sized tires and wheel rims and overcome numerous disadvantages of existing machines.

A. Introduction

In recent times a great variety of sizes in wheel rims and tires are being utilized as both original equipment and after market accessories for vehicles. Accommodating the wide variety of wheel rims and tire sizes with existing tire changing machines is difficult. Conventionally, machines have been designed predominately for so-called "standard" tire and rim sizes, but it is common nowadays for many vehicle repair shops or retail tire dealers to routinely encounter tires and rims that deviate, sometimes greatly, from the standard sizes for which conventional machines have been designed. For example only, the outer circumference and/or the width of some rims and tires may extend to and beyond the capabilities of many known machines, making it difficult, if not impossible, to change tires on certain sizes of rims with existing machines.

Especially for over-sized wheel rims and tires, proper clamping of the wheel rims to the machine may not be possible with conventional machines that were designed for smaller rims and tires. If such wheel rims can be clamped at all with known machines, they are susceptible to scratching or disfiguring the rim. The rims, however, can be expensive and any damage to them during tire changing is simply unacceptable. Over-sized tires can also be heavy and particularly difficult to handle for machine operators. While some machines have been provided with tire lifts in an attempt to address such concerns, they often have been designed for specific sizes of tires and have so far not proven to be of great benefit for over-sized rims and tires.

Of course, rims and tires that are smaller than existing machines were designed to accommodate also present difficulties and concerns. For many repair shops and tire and rim retailers, acquiring multiple machines for different sizes of rims and tires is neither practical nor desirable.

B. Inventive Embodiments of Tire Changing Machines

Unique and advantageous embodiments of tire changing machines that may be used more or less universally across a wide variety of wheel rims and tires are disclosed hereinafter. The tire changing machines greatly facilitate and accommodate over-sized tires and rims, and eliminate many challenges and concerns presented by such tires and rims to conventional tire changing machines and equipment. The uniqueness, benefits and advantages of the tire changing machines will in part be apparent and in part will be pointed out in the discussion below.

FIGS. 1-4 illustrate an exemplary embodiment of a tire changing machine 100 that overcomes numerous drawbacks of conventional tire changing machines. The tire changing machine 100 generally includes a frame or base 102 and a drive shaft assembly 104 attached to the base 102. The drive shaft assembly 104 is adapted to receive and retain a wheel rim 106 having a tire 108. A removable coupler or adapter 110 is provided to assist with securing the wheel rim 106 to the drive shaft assembly 104 after the wheel rim 106 and tire 108 is loaded and mounted onto the machine 100.

The drive shaft assembly 104, as explained in some detail below, is constructed to have multiple degrees of freedom for movement relative to the base or frame 102. Specifically, the drive shaft assembly 104 may be actuated to spin the tire 108 about a longitudinal drive axis 112, corresponding to the axial length of the drive shaft assembly, in the direction of arrow A (best shown in FIG. 1), extend and retract along the longitudinal axis 112 in the direction of arrow B in FIGS. 1 and 2, and to selectively position the drive axis 112 at different angles relative to the base or frame 102. Foot pedals 114, 116 and 118 are provided at a lower edge of the base or frame 102 for a user's convenience to actuate the drive shaft assembly 104 for each of these three purposes, respectively.

The spinning movement about the axis 112 in the direction of arrow A facilitates installation or removal of the tire 108 to and from the wheel rim 106. As the wheel is rotated or spun about the axis 112, one or more pressing tools (not shown) may be brought into engagement with the tire 108 at a location proximate the rim 106. The pressing tools exert pressure on the tire 108 to either break the tire bead seal with the rim 106, separate the inner circumference of the tire 108 including the bead over the outer lip of the wheel rim 106 to remove the tire 108, or push the inner circumference of the tire over the outer lip of the wheel rim to install the tire. A wedge tool (not shown) may also be provided to assist the pressing tools to break the tire seal with the rim 106, separate the tire 108 from the rim 106, or install the tire to the rim 106 as the tire 108 is spun about the drive axis 112. The tire 108 may be appropriately lubricated to facilitate easier removal and installation.

In different embodiments, the pressing and wedge tools may be integrated into the machine 100 for automatic operation, may be hand-held and manually applied by the operator, or may be a combination of hand held and machine integrated tools. A variety of pressing tools and wedge tools of the type noted above are known in the art, any of which may be appropriately used with the machine 100 as desired. As the tool details are well known, they are not described in any further detail herein. It is contemplated that other tools in addition to or in lieu of pressing tools and/or wedge tools may be provided and used with the machine 100 for the same or different purposes.

The extension and retraction of a portion of the drive shaft assembly 104 along the axis 112 in the direction of arrow B facilitates displacement of a portion of the drive shaft assembly 104 and an application and release of clamping force to maintain the wheel rim 106 to the drive shaft assembly 104 so that the wheel rim 106 and associated tire 108 can be spun about the axis 112. The clamping action is described in detail below, but in summary the clamping force is applied by retracting a portion of the drive shaft assembly 104 toward the rim 106 (downward in FIGS. 1 and 2 along the arrow B) to pull the adaptor or coupler 110 against the rim 106. The clamping force is released by extending a portion of the drive shaft assembly 104 away from the wheel rim 106 (upward in FIGS. 1 and 2 along the arrow B) to separate the coupler 110 from the wheel rim 106.

The coupler 110 in one embodiment may be cone-shaped on one end facing the wheel rim 106. The cone-shaped coupler 110 extends through a central aperture in a hub mount pad 120 (FIG. 1) of the rim 106 where the wheel rim 106 is attached to the vehicle in use. As will become evident, the cone-shaped coupler 110 engages a threaded portion of the drive shaft assembly 104 that also extends through the aperture in the hub mount pad 120 of the rim 106. The coupler 110 may be hand turned about the axis 112 by a user on the portion of the drive shaft assembly 104 with handles 119 provided in the coupler 110 to advance the coupler 110 into surface engagement with the hub mount pad 120. As the coupler 110 is turned to advance the coupler 110 on toward the hub mount pad 120, the cone-shaped coupler 110 aligns and centers the hub mount pad 120 with respect to the drive shaft assembly 104. A portion of the drive shaft assembly 104, as explained in detail further below, is then retracted to generate adequate clamping force and pressure so that the wheel rim 106 may be spun about the axis 112 for removal and installation of a tire without slipping of the rim 106, and specifically the hub mount pad 120, and the coupler 110.

By applying the clamping force to the hub mount pad 120 instead of the circumferential periphery of the rim 106, and also by using a self-centering coupler 110, rather relatively complicated centering and gripping mechanisms known in the art for clamping the outer periphery of the rim 106 where it meets the tire 108 can be avoided. Also, because the clamping force is applied to the hub mount pad 120 at the center of the rim 106, the machine 100 can be substantially universally used with wheel rims and tires having greatly varying outer diameters and circumferences, as opposed to existing machines that are practically limited to satisfactory use with a predetermined and much smaller range of wheel rim diameters by virtue of clamping mechanisms designed to engage the outer periphery of the wheel rim.

In an illustrative embodiment, the coupler 110 is a known coupler or adaptor that is sometimes referred to as a speed nut. It is contemplated, however, that other couplers, fasteners or adapters may be utilized in further and/or alternative embodiments as desired in lieu of the coupler 110. Further, while a self-centering coupler such as the coupler 110 is desirable to align and center the wheel rim 106 with respect to the drive shaft assembly 104, it is by no means required that the coupler center the wheel rim 106 as it is applied. That is, alignment and centering of the wheel rim 106 could optionally be accomplished using other features in the machine, or even manually by an operator or user of the machine 100, in further and/or alternative embodiments.

In still other embodiments, alignment and/or clamping of the rim 106 may be accomplished automatically by the machine 100 without manual assistance of a machine operator in installing the coupler 110. For example, in one contemplated embodiment, a drive shaft having a smooth outer surface could be utilized with a contoured coupler element that is hydraulically, pneumatically, or electrically actuated to generate a clamping force upon the hub mount pad 120 while also aligning and centering the hub mount pad relative to the drive shaft assembly 104.

As shown in FIGS. 1-4, the drive shaft assembly 104 may be selectively positioned in at least two positions at different angles relative to the base or frame 102 wherein the drive axis 112 is differently oriented relative to the base or frame 102. In the exemplary drawings of FIGS. 1 and 2, the drive shaft assembly 104 is positionable to extend substantially vertically above the base or frame 102 for advantageous changing of the tire 108 on the wheel rim 106, sometimes referred to as a tire changing position. In the exemplary drawings of FIGS. 3 and 4, the drive shaft assembly 104 is also positionable to extend substantially horizontally from the base or frame 102 for advantageous loading of the wheel rim 106 and associated tire 108 onto the drive shaft assembly 104, sometimes referred to as a wheel rim mounting position. In the example illustrated, the drive shaft assembly 104 is pivoted or tilted for about 90 degrees at an end of the drive shaft assembly 104 proximate the base or frame 102 to move the drive shaft assembly 104 between the tire changing position and the wheel rim mounting position. While such movement of the drive shaft assembly is believed to be convenient and advantageous for machine operators, it is appreciated that the drive shaft assembly can be pivoted or tilted relative the base or frame 102 by amounts more or less than 90 degrees as desired or as needed to facilitate the mounting of a rims and tires having a given size. Neither the vertical nor horizontal positions of the drive shaft assembly 104 illustrated in FIGS. 1-4 are required to appreciate or realize the benefits of the machine 100.

Figure 2:
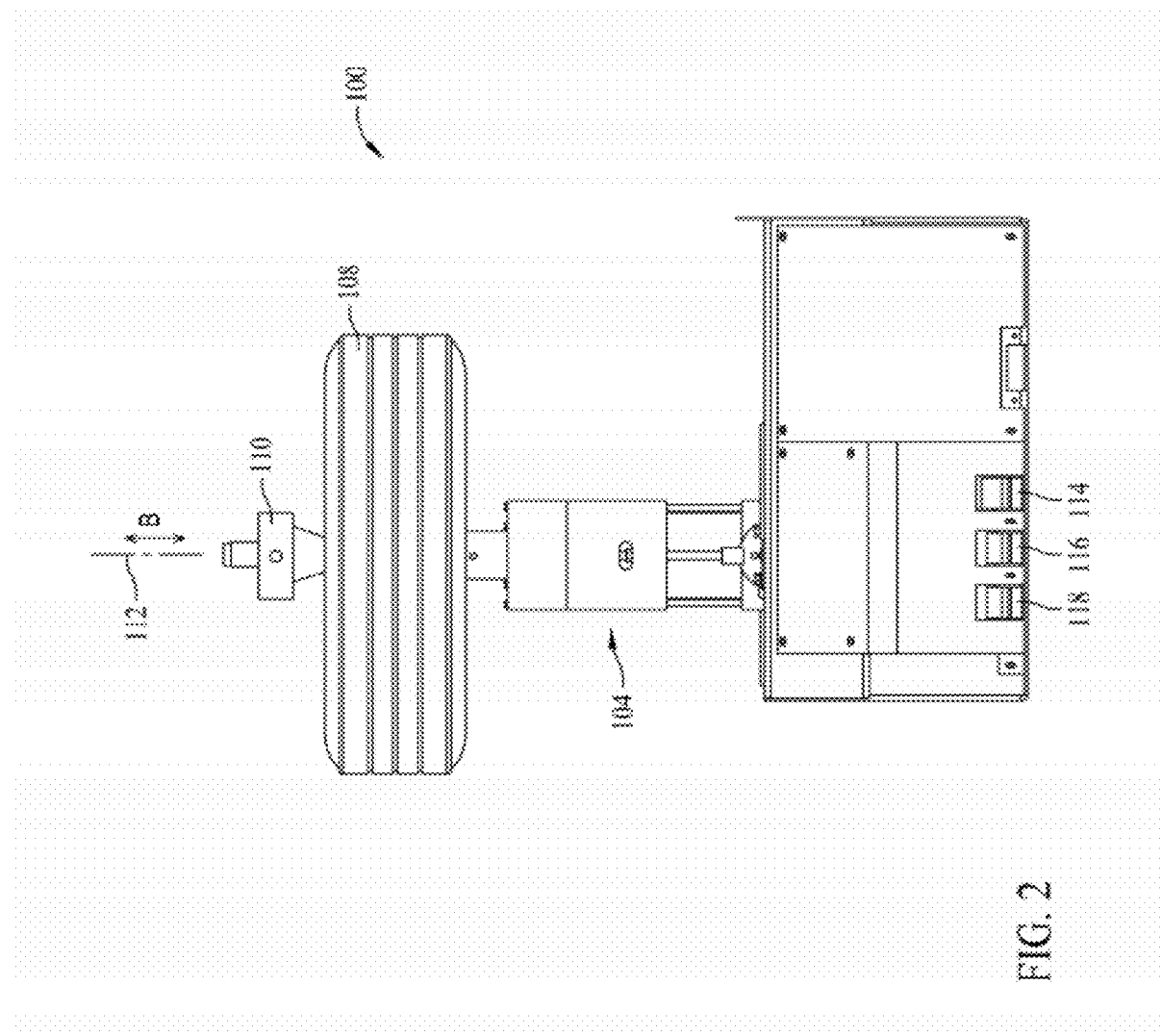
FIG. 2 is a side elevational view of the machine shown in FIG. 1.
Figure 3:
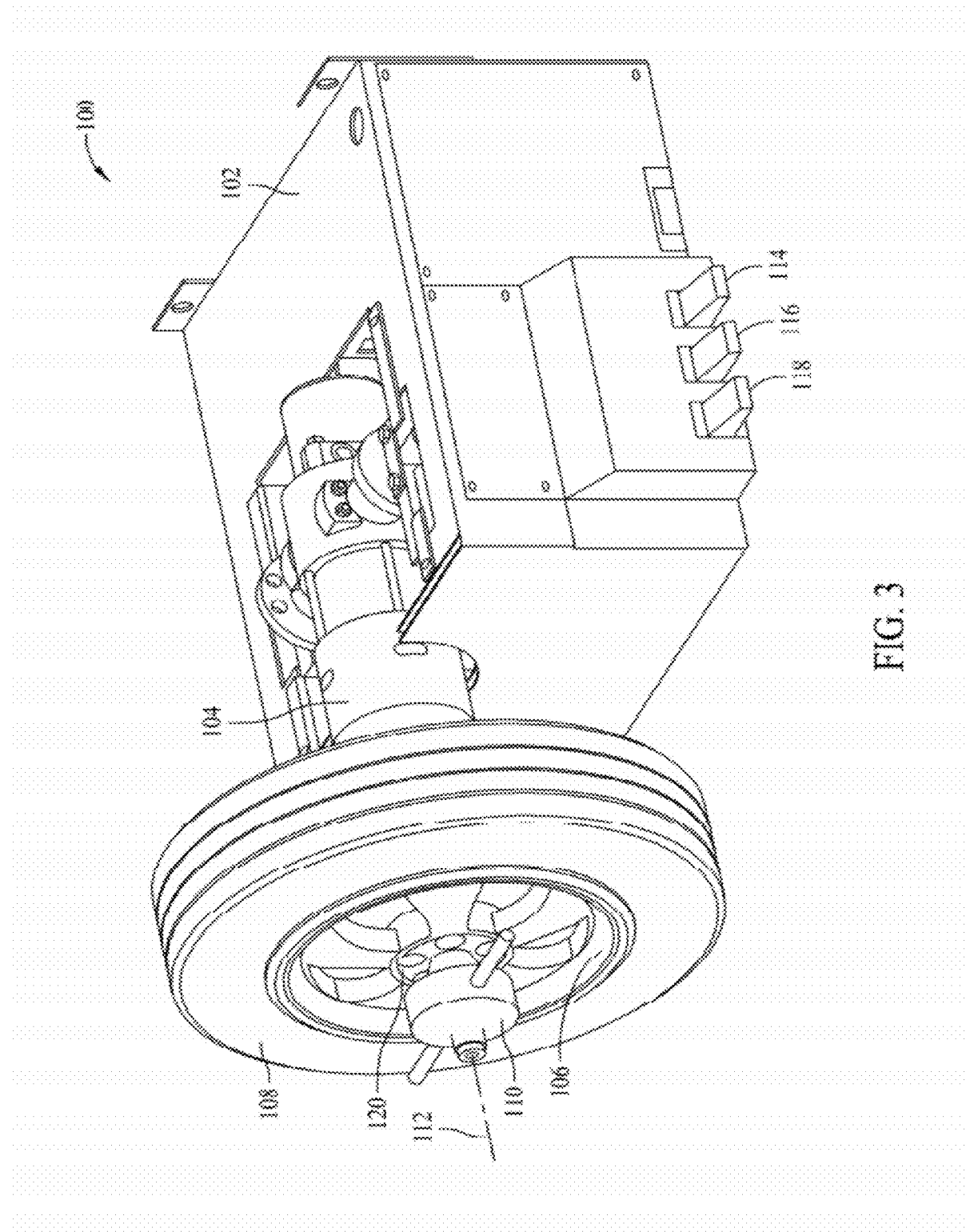
FIG. 3 is a perspective view of the machine shown in FIG. 1 with the drive shaft assembly in a wheel rim mounting position.
Figure 4:
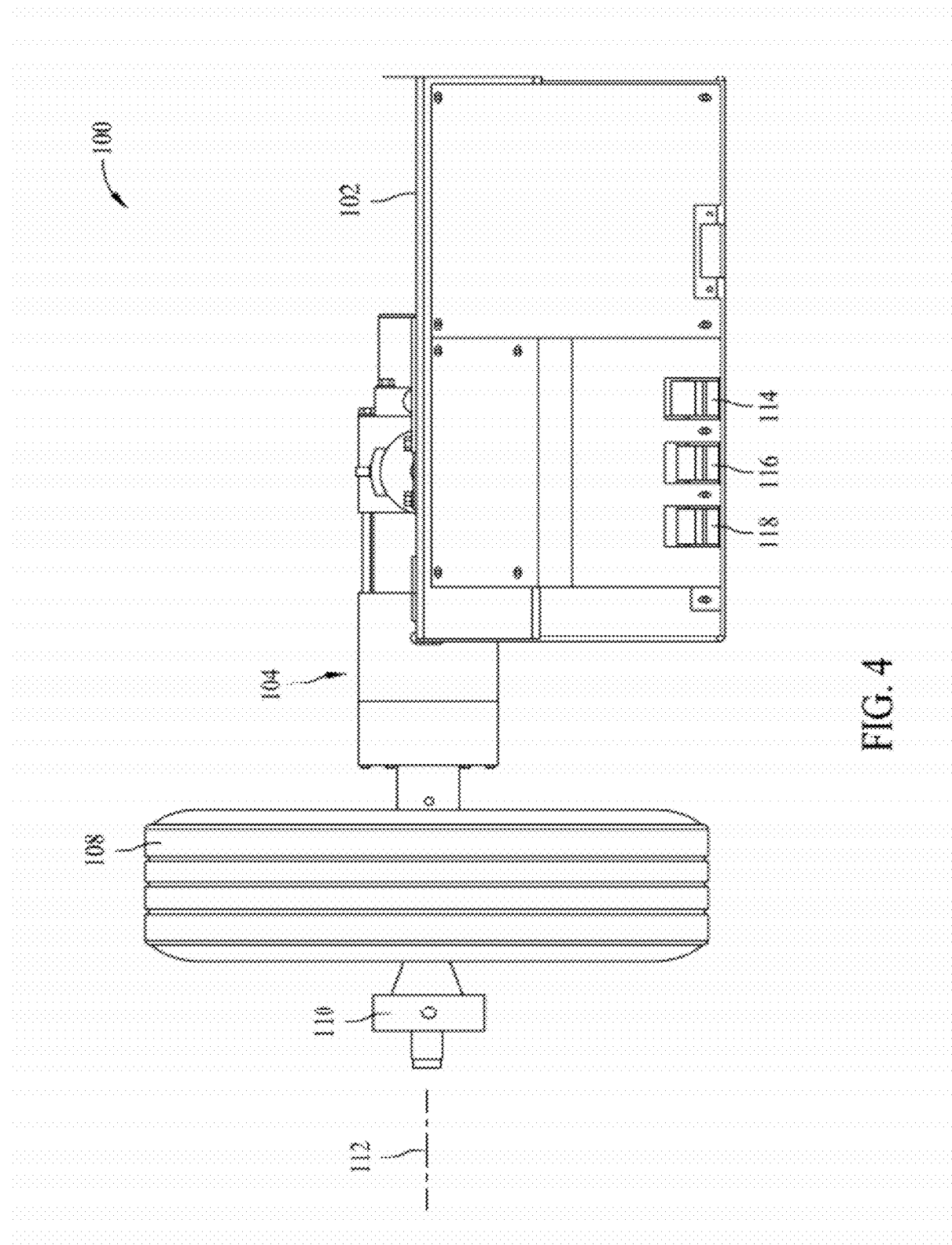
FIG. 4 is a side elevational view of the machine shown in FIG. 3.

As is evident from FIGS. 3 and 4, and in contrast to the tire changing position shown in FIGS. 1 and 2, the wheel rim mounting position locates the end of the drive shaft assembly 104 much closer to the ground so that the machine operator need not lift the wheel rim 106 and tire 108 very far, if at all, to slip the central aperture of the hub mount pad 120 over the end of the drive shaft assembly 104 to engage the hub mount pad 120 of the rim 106 to the drive shaft assembly 104. Once the wheel rim 106 is so engaged to the hub mount pad 120, the drive shaft assembly 104 may be moved from the wheel rim mounting position shown in FIGS. 3 and 4 to the tire changing position shown in FIGS. 1 and 2 for changing of the tire 108. As the drive shaft assembly 104 is moved from the wheel rim mounting position to the tire changing position, it lifts the wheel rim 106 and tire 108 to the tire changing position. Because the drive shaft assembly 104 functions as a lift, separate lifting mechanisms found in some existing machines can therefore be eliminated, and handling of the wheel rim 106 and the tire 108 by the machine operator can be substantially minimized. This is convenient for all sizes of rims and tires, but is especially advantageous for over-sized rims that are both bulky and heavy.

Another advantage of the drive shaft assembly 104 that is functional as a lift is that the drive shaft assembly 104 can be used to lift a tire onto the machine 100 while the wheel is clamped to secure the wheel to the assembly 104. This too is particularly advantageous for heavy tires, and allows a machine operator to operate the lift in a hands-free manner. In contrast, with many known machines having tire lift features, the tires are not positively secured to the lifts, such that operating the lifts with oversized, and/or heavy tires in an unclamped condition can be precarious. Known lifts are typically designed in such a way that the lifts may be prevented from operating while the wheel is clamped to the machine. Consequently, operators must support the tires to some extent during lifting operations.

After the tire is changed on the wheel rim 106, the drive shaft assembly 104 may be moved from the tire changing position to the wheel rim mounting position wherein the wheel rim 106 and tire 108 may be conveniently removed from the drive shaft assembly 104 at a location close to the ground to minimize, if not eliminate, the amount of lifting of the wheel rim 106 and tire 108 to remove the wheel rim 106 and tire 108 from the machine 100.

Figure 5:
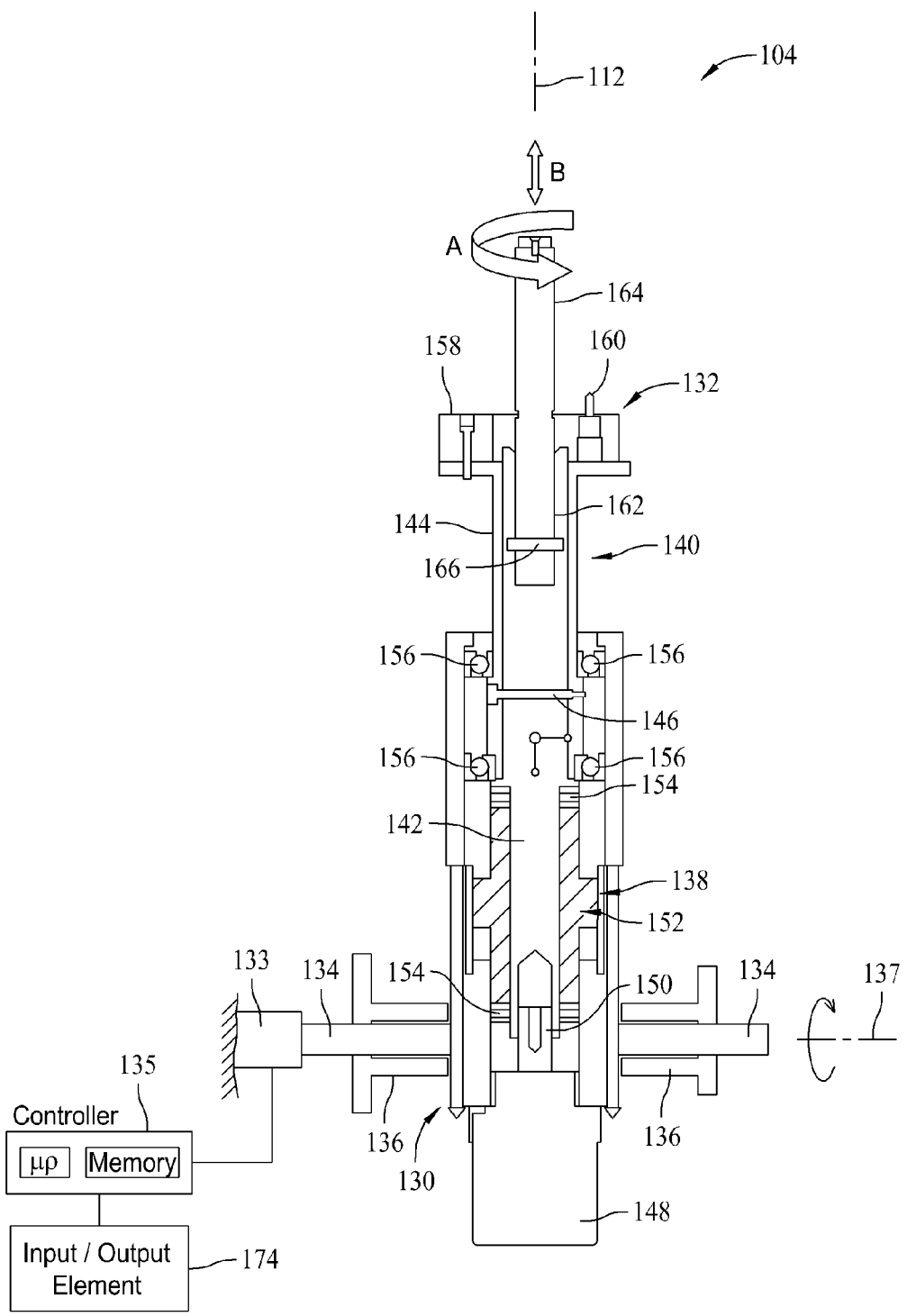
FIG. 5 is a partial schematic assembly view of a drive shaft assembly for the machine shown in FIGS. 1-4.
Figure 6:
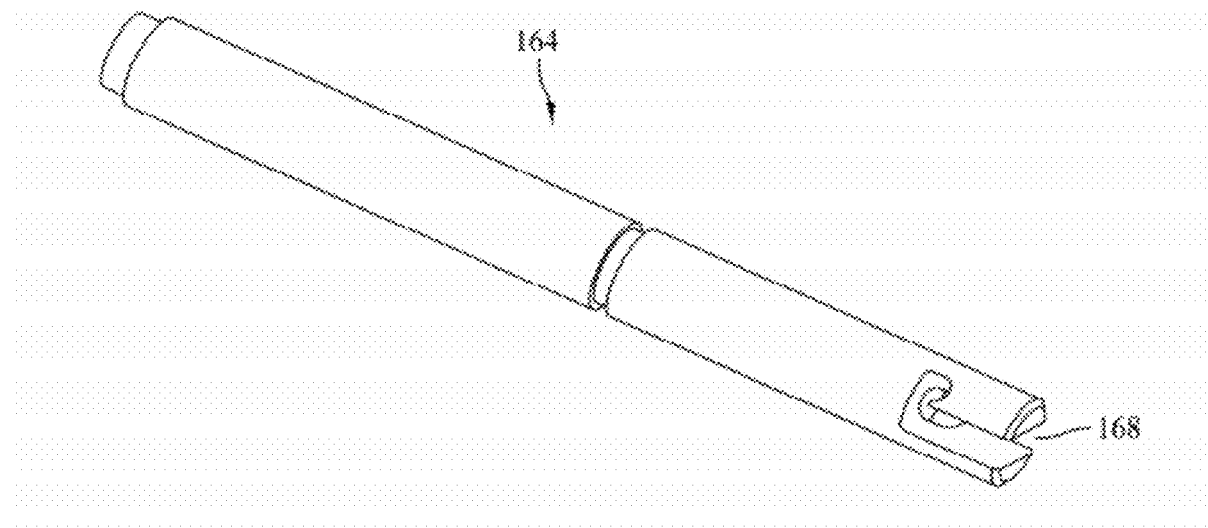
FIG. 6 illustrates an exemplary spindle for the drive shaft assembly shown in FIG. 5.

Referring now to FIGS. 5 and 6, FIG. 5 is a partial schematic assembly view of an exemplary drive shaft assembly 104 in which the various functional features described above may be implemented. FIG. 6 is a partial exploded view of the drive shaft assembly 104.

The drive shaft assembly 104 generally includes a proximal end 130 that is mounted to the base or frame 102 of the machine 100 (shown in FIGS. 1-4) and a distal end 132 that extends outwardly from the base 102 and away from the proximal end 130. The distal end 132 is constructed to receive the wheel rim 106 (shown in FIGS. 1-4) and the proximal end 130 is constructed for tilting or swinging movement, sometimes referred to as pivoting movement, relative to the base to change the orientation of the drive axis 112 (also shown FIGS. 1-4) relative to the base 102. This pivoting movement is provided via a pair of pivot shafts 134 coupled on one end to the proximal end 130 of the drive shaft assembly 104 and to yokes (not shown) on the machine base or frame 102. Rotary unions 136 are also provided in an illustrative embodiment, and supply a pressurized fluid, such as hydraulic fluid, to turn the pivot shafts 134 about a pivot axis 137 and position the drive axis 112 at a desired angle relative to the machine base or frame 102, including but not limited to the tire changing position and the wheel rim mounting position previously described. It is contemplated that in other embodiments the rotary unions 136 may be omitted entirely.

Optionally, but advantageously in an exemplary embodiment, an angle sensor element 133 may be provided to sense or detect an angular position of the pivot shafts 134 relative to the base. The angle sensor element 133 in various embodiments may be a hall effect sensor, a potentiometer, an encoder, or other known device familiar to those in the art. The angle sensor element 133 may provide a signal input to a controller 135 such that preferred angular positions of the pivot shafts 134 may be stored, retrieved and automatically executed by the machine 100 upon demand. In particular, a machine operator may store one or more preferred wheel rim mounting positions for retrieval by the machine 100 for repeated use when changing tires.

In various embodiments, the controller 135 may be for example, a microcomputer, a programmable logic controller, or other processor-based device. Accordingly, the controller 135 may include as shown in FIG. 5, a microprocessor and a memory for storing instructions, control algorithms and other information as required to function in the manner described. The controller memory may be, for example, a random access memory (RAM), or other forms of memory used in conjunction with RAM memory, including but not limited to flash memory (FLASH), programmable read only memory (PROM), and electronically erasable programmable read only memory (EEPROM).

By storing preferred operating positions of the pivot shafts 134 in machine memory, a machine operator need not manually position the drive axis 112 to a wheel rim mounting position each time the machine is used. Rather, once a satisfactory wheel rim mounting position is determined once by the operator, it may be stored in machine memory for the convenience of the operator. Thus, for example, when changing a number of tires on rims that are approximately the same size, the machine may automatically assume a satisfactory wheel mounting position stored in machine memory. More than one wheel mounting position could be saved and stored in machine memory to accommodate the preferences of different machine operators, or to accommodate different sizes of wheel rims.

The angle position element 133 and 135 provides a good deal of flexibility to the machine 100 and convenience for various operators having different operating preferences. An input/output element 174 (FIG. 5) such as a touch screen display or other element may be provided for the use and benefit of machine operators to conveniently store preferred operating positions and retrieve them for later use. Once a stored position is selected by a user, the machine may automatically position the pivot shafts to the preferred angle to provide the desire wheel rim mounting position.

The angle position element 133 may further be utilized as a control feedback element to monitor proper operation of the machine, implement safety features, and facilitate other features in the machine. It is contemplated that more than one sensor element 133 may likewise be provided if desired to serve similar purposes or other purposes in the machine 100. For example, sensors may be provided to detect, in addition to angular position, rotational speeds and force conditions in various parts of the machine 100 in use.

While two pivot shafts 134 are illustrated on either side of the drive shaft assembly proximal end 130 as shown in FIG. 5, it is appreciated that only one pivot shaft 134 may be provided in another embodiment if desired. Also, while hydraulic pivot shafts 134 may be advantageous for use with the drive shaft assembly 104, they are by no means required. Those in the art will no doubt recognize that the swinging, pivoting or tilting about the axis 137 may be accomplished using other well known techniques. As a few examples, pneumatic features may be utilized instead of hydraulic features, electric motors with or without mechanical linkages such as gears and cam followers may be used in lieu of compressed fluid components to re-orient the drive axis 112 relative to the machine base or frame 102, stored energy and spring assisted features may be utilized to partially or completely assist pivoting of the proximal end 130 between different operating positions, or even manually operable features such as latch, detent and ratchet systems may be utilized to swing, tilt, or pivot the drive shaft assembly 104 at the proximal end 130. Still other variations are believed to be within the grasp of those in the art to implement similar function and purpose to the drive shaft assembly 104.

It is also contemplated that pivoting of the drive shaft assembly 104 may be accomplished in the machine at a location other than at the distal end 130 if desired, albeit with a greater clearance in the machine base or frame 102 to accommodate a greater swing arm of the drive shaft assembly 104.

The exemplary drive shaft assembly 104 further includes a generally hollow drive shall cylinder 138 and a drive shaft 140. The drive shall 140 includes an inner shaft 142 extending through the drive shaft cylinder 138 and an outer shaft 144 keyed to the inner shaft 142 with, for example only, a fastener such as a shoulder bolt 146. An actuator such as a motor 148 is coupled to an end of the drive shaft cylinder 138. The motor 148 includes an output shaft 150 that is drivingly coupled to an end of the inner drive shaft 142 at one end. Optionally, a gearbox or transmission could be provided between the inner shaft 142 and the motor shaft 150 in lieu of the direct drive arrangement shown wherein the shaft 150 is directly coupled to the inner drive shaft 142.

A hollow piston 152, through which the inner drive shaft 142 passes, is situated within the drive shaft cylinder 138, and thrust bearings 154 are provided on either end of the piston 152. Roller bearings 156 are also provided in the drive shaft cylinder 138 to support the outer drive shaft 144 and to facilitate rotation of the drive shaft 140 about the axis 112 in the direction of arrow A. By virtue of the piston 152, the drive shaft 140 is extendable and retractable from the drive shaft cylinder 138 along the drive axis 112 in the direction of arrow B. That is, the piston 152, and the attached drive shaft 140 may be axially displaced within the drive shaft cylinder 138 to extend or retract the drive shaft 140 relative to the drive shaft cylinder 138. In an exemplary embodiment, the motor 148 and the piston 152 are hydraulic components, although it is contemplated that other actuating and positioning features and components may likewise be implemented to serve the function and purpose of displacing the drive shaft 140 within the cylinder 138 to extend and retract the drive shaft 140. Examples of alternatives to the hydraulic motor and piston include pneumatic components, electric motors and linkages, or other components and features familiar to those in the art.

Figure 7:
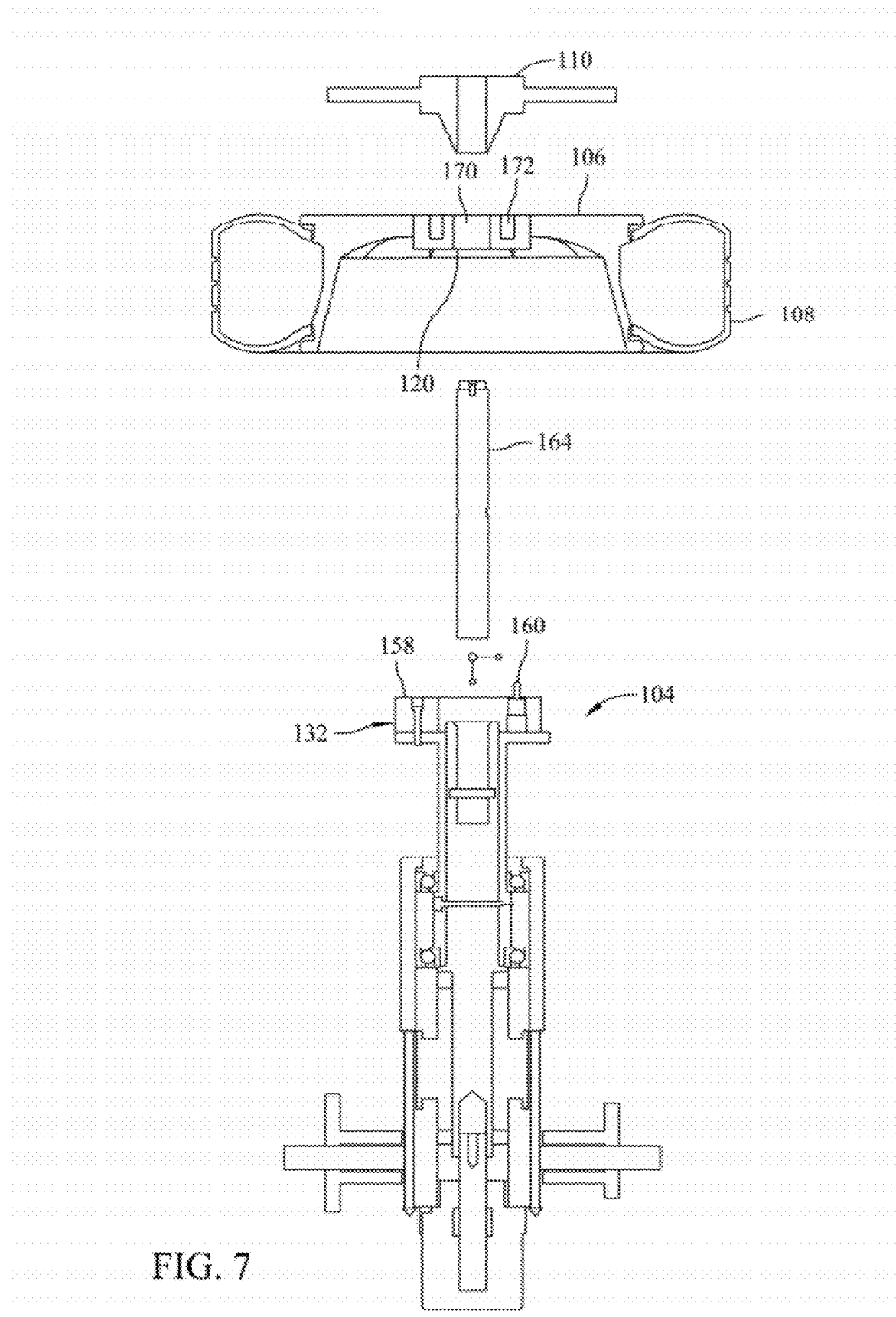
FIG. 7 is a partial exploded view of the drive shaft assembly shown in FIG. 5.

As shown in FIGS. 5 and 7, a platen 158 extends from the outer drive shaft at the distal end 132 of the assembly. The platen 158 is sized and dimensioned to support the hub mount pad 120 (FIGS. 1 and 3) of the wheel rim 106 having a tire 108 to be changed. An anti-rotate pin 160 projects from the upper surface of the platen 158 so that when the wheel rim 106 is received on the platen 158, the pin 160 extends through one of the lug holes of the hub mount pad 120 and prevents the hub mount pad 120 from rotating relative to the platen 158.

The inner drive shaft 142 is formed with an open bore 162 at its distal end extending into the platen 158. A mounting spindle 164 is removably engageable with the bore 162 and may be secured to the inner drive shaft 142 with a pin 166. As best seen in FIG. 6, the mounting spindle 164 is generally formed in the shape of an elongated cylinder having a contoured slot 168 at one end that facilitates fitting inserting the spindle 164 over the pin 166 and securing the spindle to the pin 166 by turning the spindle 164 for a quarter turn in one example. As such, the spindle 164 may be easily removed if desired yet securely retained to the inner drive shaft 142 for operation of the machine.

In one embodiment, the mounting spindle 164 may have a smooth outer surface where the coupler 110 engages it. Such engagement between the mounting spindle 164 and the coupler 110 may be of the type described, or similar to that described, in commonly owned US Patent Application Publication No. 2006/0266105 A1. That is, in one example, the engagement may involve the spindle 164 having a generally smooth outer surface with one or more slots formed thereon that engage spring loaded pawls, for example, provided in the coupler 110 to hold the coupler captive on the spindle 164. Providing a smooth surface on the mounting spindle 164 may be preferable to reduce or eliminate any possibility that the spindle 164 could scratch, nick, mar or otherwise damage the wheel rim when the spindle is extended through it. This is by no means required, however, and in other embodiments, the end of the mounting spindle 164 may include threads and/or other fastening features familiar to those in the art to engage and secure the coupler 110 (FIGS. 1-4) thereto.

As shown in FIG. 7, in use the spindle engages the distal end 132 of the drive shaft assembly and is extended through a central aperture 170 of the hub mount pad 120 of a rim 106 having a tire 108 to be changed. The platen 158 supports the hub mount pad 120 of the rim 106, and the anti-rotate pin 160 extends through one of the lug holes 172 in the hub mount pad. The coupler 110 may then be fitted over the distal end of the mounting spindle 164 to clamp the hub mount pad 120 to the platen.

C. Inventive Tire Changing Methods

Having now explained the structure and operation of the exemplary machine 100, an exemplary method of changing a tire therewith will now be specifically described in relation to FIGS. 8-11.

Figure 8:
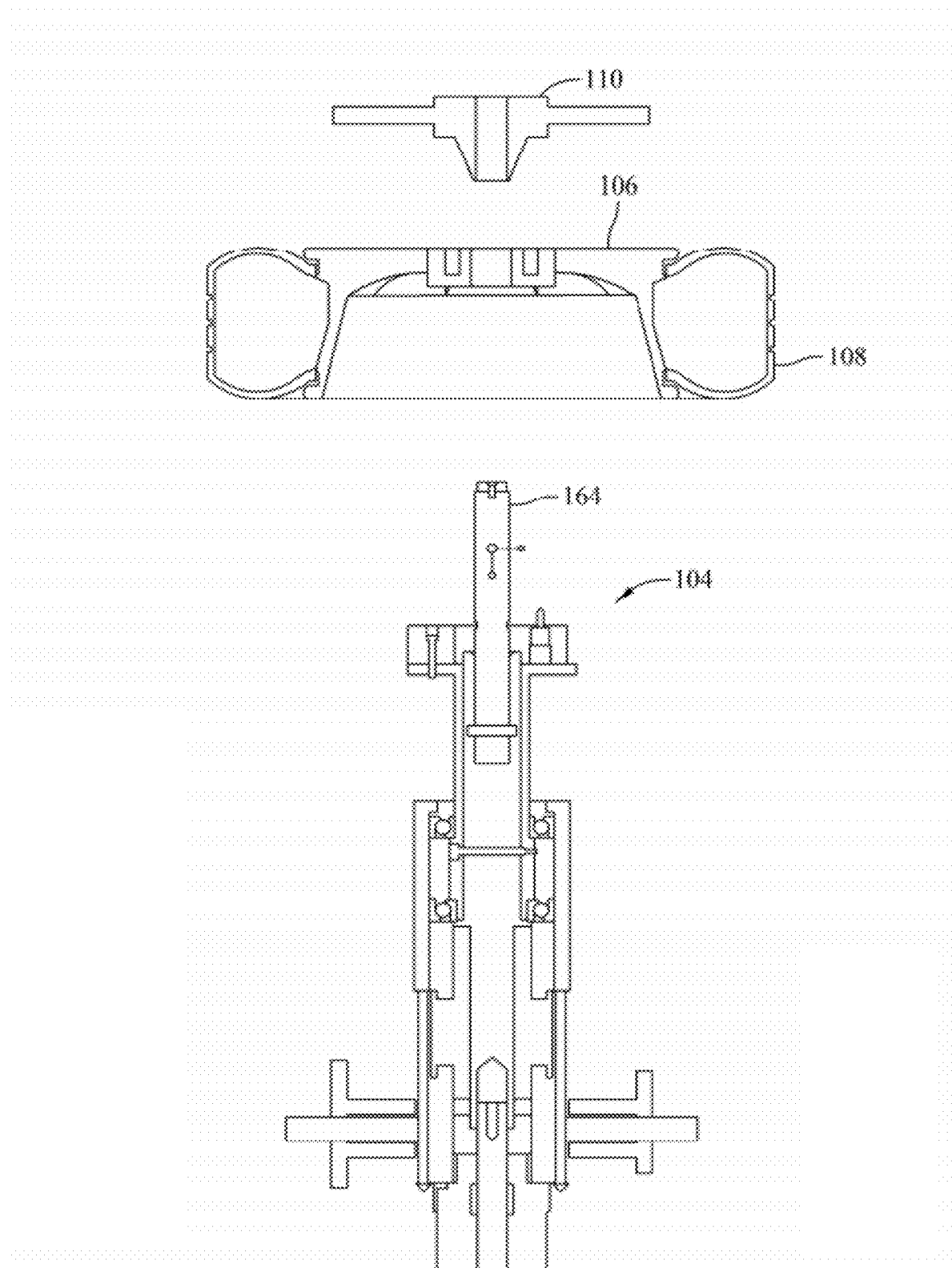
FIG. 8 illustrates the drive shaft assembly shown in FIGS. 5 and 6 at a first stage of mounting a wheel rim.
Figure 9:
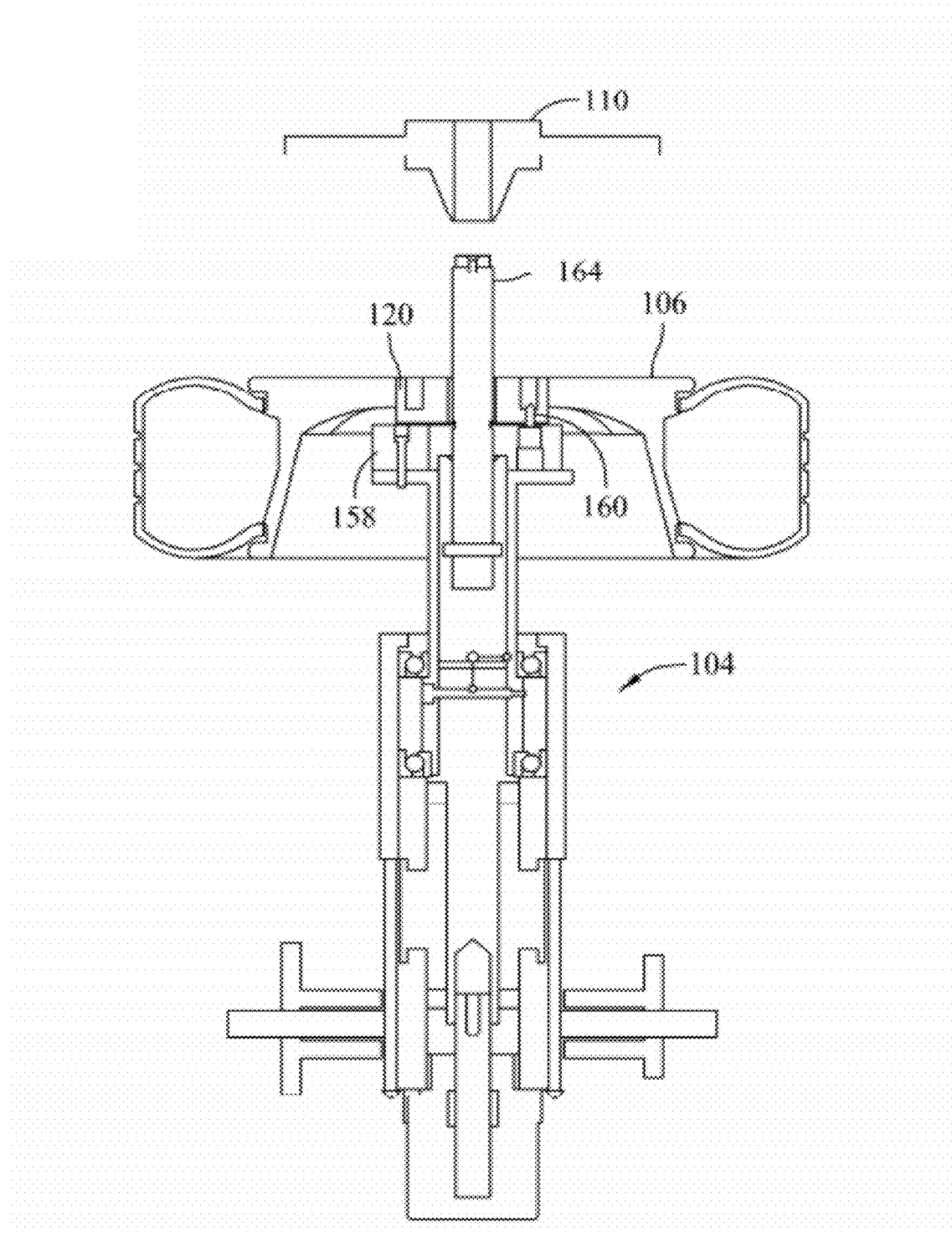
FIG. 9 illustrates the drive shaft assembly at a second stage of mounting the rim.
Figure 10:
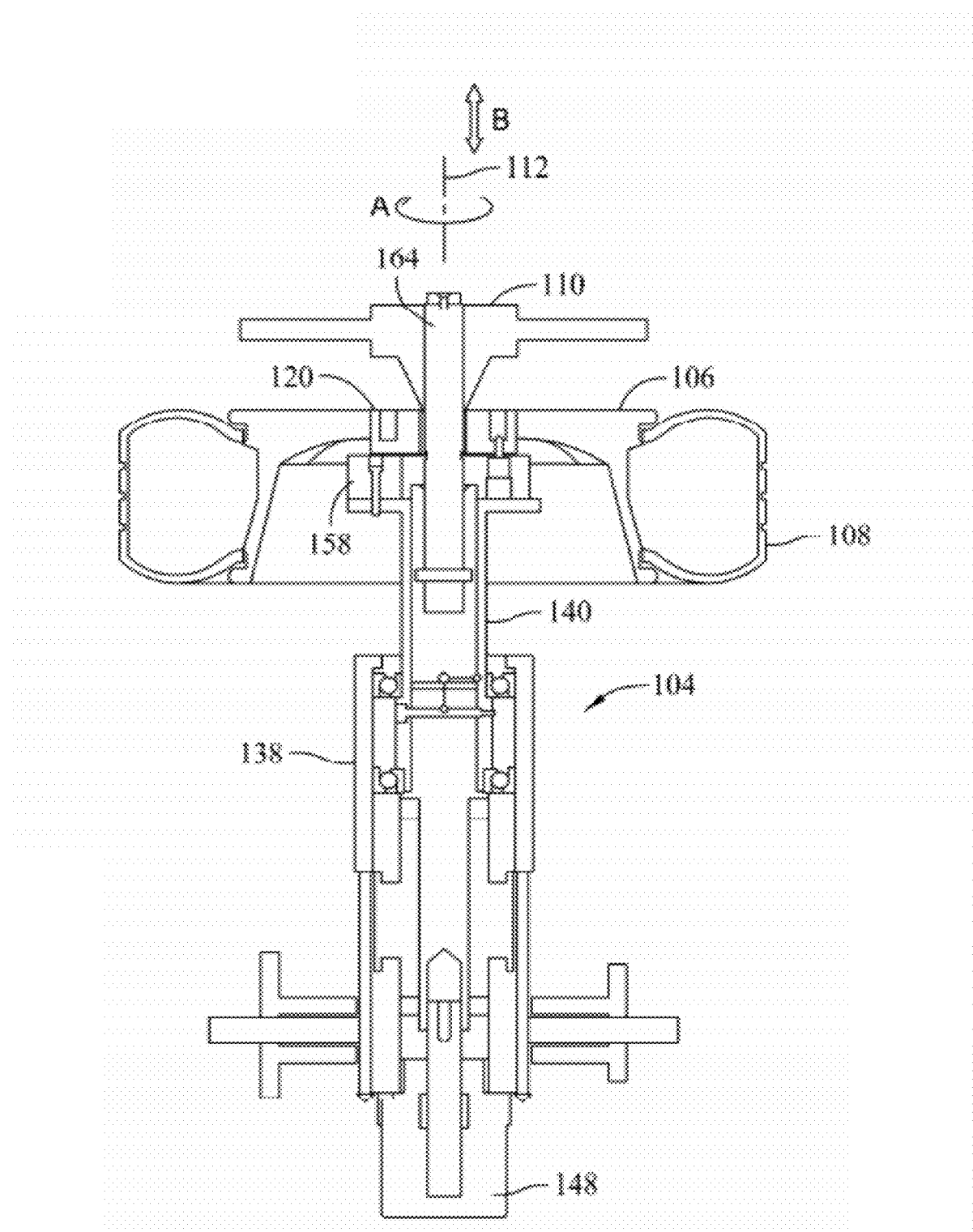
FIG. 10 illustrates the drive shaft assembly at a third stage of mounting the rim.

An exemplary sequence of steps to mount the rim 106 to the drive shaft assembly 104 is shown in FIGS. 8-10. In FIG. 8, the mounting spindle 164 is coupled to the distal end of the drive shaft assembly 104. In FIG. 9, the wheel rim 106 is fitted over the spindle 164 and the hub mount pad 120 is supported by the platen 158 with the anti-rotation pin 160 extending into one of the lug holes of the hub mount pad 120. FIG. 10 illustrates the cone-shaped coupler 110 engaged to the exposed end of the mounting spindle 164 and aligning and centering the wheel rim 106 with respect to the drive axis 112.

At this point, the inner drive shaft 142 may be retracted, in response to the machine operator depressing one of the foot petals 114, 116, 118 (FIGS. 1-4) downwardly in the direction of arrow B in FIG. 9 to apply a sufficient clamping force on the hub mount pad 120 to ensure that the hub mount pad 120 cannot move relative to the drive shaft 140 during operation of the machine 100. When the clamping of the rim 106 is complete, the motor 148 may be actuated by the operator, also by depressing one of the foot pedals 114, 116, 118 to spin the rim 106 and the tire 108 about the drive axis 112. While the tire 108 is spinning, pressing and removal tools familiar to those in the art may be used, by one or both of the machine or the operator, to break the seal of the tire bead and to disengage the tire 108 from the rim 106. The tire 108 may then be rather easily removed from the rim 106.

A replacement tire may be installed to the rim 106 by spinning the rim 106 about the drive axis 112 and using pressing tools and the like to force the tire bead into engagement with the rim 106. When tire-changing operations are complete, the drive shaft 140 may be extended from the drive shaft cylinder 138 to release the clamping force on the hub mount pad 120 of the rim 106. After removing the coupler 110 from the mounting spindle 164, the rim 106 and associated tire 108 may be removed from the drive shaft assembly 104.

While an exemplary rim mounting and tire changing sequence has been described, it is to be appreciated that it is not the only mounting sequence that may be beneficial for a machine operator, and deviations or modifications from the exemplary mounting sequence may be advisable in other embodiments of the machine and/or method.

Figure 11:
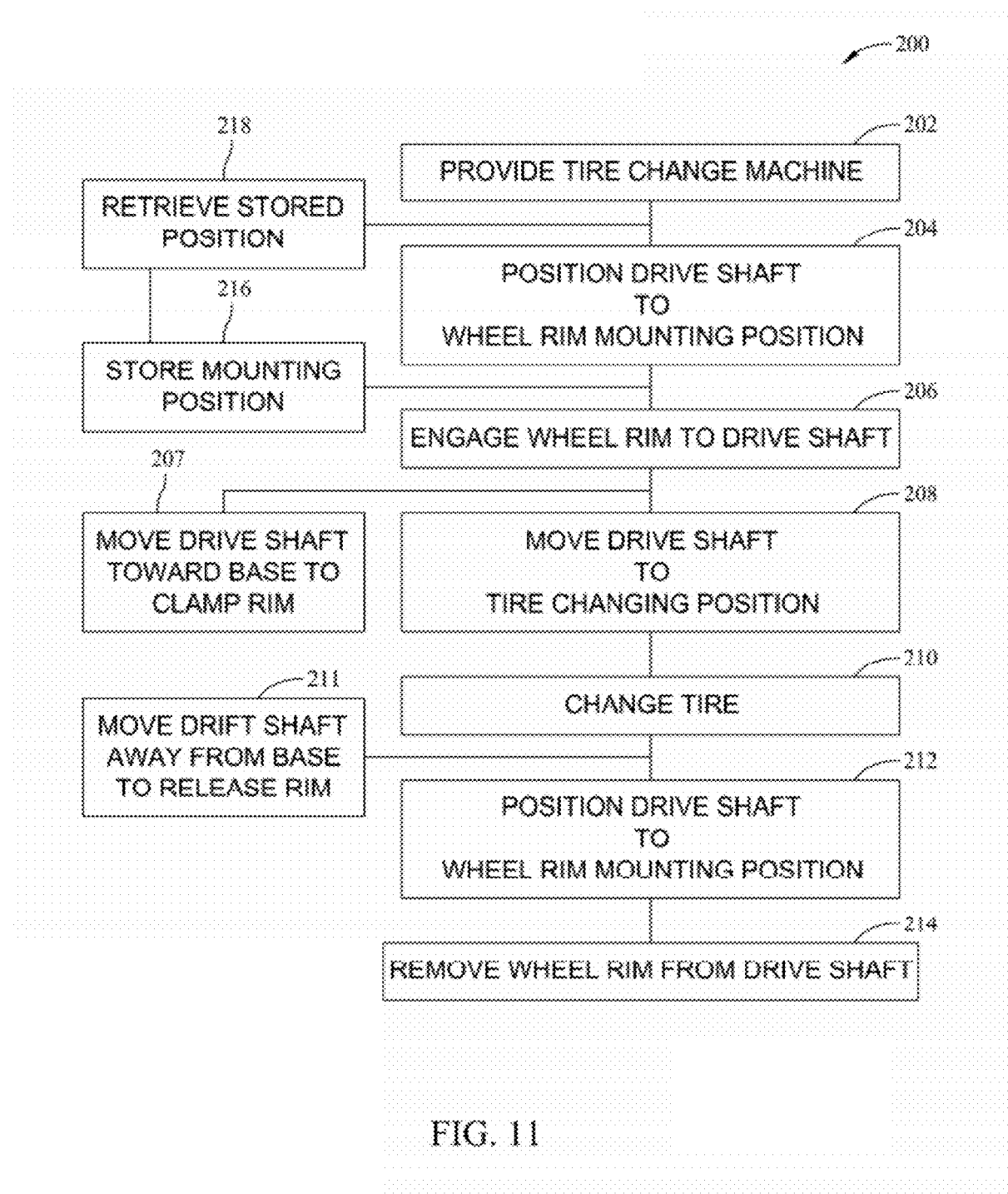
FIG. 11 is a method flowchart of an exemplary method for changing a tire using the machine shown in FIG. 1.

FIG. 11 is an illustrative flowchart of an exemplary method 200 of changing a tire on a wheel rim for a vehicle, such as the wheel rim 106 and tire 108 illustrated in FIGS. 1-4 and 7-10. The method 200 utilizes a machine, such as the machine 100 described above including a base or frame 102 and a drive shaft 140 for rotating the tire about a rotational axis, such as the drive axis 112 (FIGS. 1-5 and 10). The drive shaft 140 is positionable relative to the base or frame 102 in a wheel rim mounting position (FIGS. 3 and 4) and a tire changing position (FIGS. 1 and 2).

As shown in FIG. 11, the method includes the steps of providing 202 the machine, positioning 204 the drive shaft to the wheel rim mounting position, engaging 206 the wheel rim to the drive shaft, and moving 207 the drive shaft toward the machine base to clamp the rim in a predetermined position on the machine. The method also includes moving 208 the drive shaft to the tire changing position with the wheel rim engaged to the drive shaft, thereby lifting wheel rim from the wheel rim mounting position to the tire changing position. The method may further include changing 210 the tire with the drive shaft in the tire changing position, moving 211 the drive shaft away from the machine base to release the clamping force on the rim, positioning 212 the drive shaft back to the wheel rim mounting position, and removing 214 the wheel rim from the drive shaft.

Many modifications and variations of the method 200 are possible while affording similar benefits and advantages, and also while avoiding disadvantages of conventional tire changing machines. Such modifications may include performance of additional steps not shown in FIG. 7, omission of certain steps associated with the method 200, adjustments in the order or sequence of the steps, and/or numerous variations in acts associated with the steps to perform them. Some examples of such modifications and variations will be discussed below, but other modifications and variations not discussed are believed to be within the skill of those in the art.

For example, the machine could be provided 202 with the drive shaft in the wheel rim mounting position for the convenience of the user to start the method, such that step 204 would be unnecessary. The steps of positioning 204 the drive shaft 204 to the wheel rim mounting position, moving the drive shaft 208 to the tire changing position, and positioning the drive shaft 212 back to the wheel rim mounting position could be accomplished in a variety of ways. This could be accomplished, for example, using one or more of the foot pedals 114, 116, 118 shown in FIGS. 1-4, although other operator or machine control inputs may alternatively be used, including but not limited to hand operable pushbuttons, levers, key pads, and touch sensitive control interfaces. Additionally, the positioning of the drive shaft relative to the base may be accomplished in an automated manner using, for example only, position encoders or numerical control methodology, sensor-based feedback technology, machine vision and imaging technology, or other technologies and techniques familiar to those in the art.

The steps of positioning and moving the drive shaft may further encompass a variety of beginning and end points either chosen by the machine operator or determined in an automated manner by machine controls. That is, the drive shaft may be positioned and moved between substantially vertical and horizontal positions, and the drive shaft may be tilted about the proximal end to accomplish the movement as described above. It is to be realized, however, that such substantial vertical and horizontal positioning may be considered entirely optional, and the drive shaft need not be pivoted or tilted at its distal end to effect the desired positioning of the drive shaft.

It is possible, for example, that the wheel rim mounting position may be beneficially located at a substantially oblique angle relative to the machine that is not substantially horizontal, while still allowing for convenient loading of a wheel rim onto the drive shaft. It is likewise possible that the tire changing position involve something other than a substantially vertical orientation of the drive shaft. It is also possible, for example, that the drive shaft may be moved between two inclined positions at oblique angles relative to the machine or to the floor upon which the machine sits for mounting of wheel rims and for changing tires, respectively.

Additional moving and positioning steps for the drive shaft may also be desirable in some embodiments. When changing over-sized tires, for example, after the tire seal is broken with the rim, the drive shaft assembly may be desirably moved to the wheel rim mounting position for removal of the tire and for placement of a replacement tire onto the rim. The drive shaft assembly could then be moved to the tire changing position, lifting the replacement tire into position for actual installation to the rim. Particularly large and heavy tires therefore can be changed with minimal lifting and handling on the part of the machine operator.

In various embodiments, the step of engaging 206 or removing 214 the wheel rim from the drive shaft may be accomplished manually by the operator(s) lifting, pushing or pulling the wheel rim and tire onto or off of the drive shaft. Additionally, the engagement or removal of the wheel rim may be accomplished with the assistance of other tools or machine-implemented features, whether manually operable or automated. Such machine-implemented features may be part of the tire changer machine or another machine.

The engagement or removal of the wheel rim may incorporate the rim mounting sequence described above in relation to FIGS. 7-10, although certain aspects of the mounting sequence may be considered optional or may be unnecessary for certain embodiments of the machine 100 and/or method 200. The steps of clamping 207 or releasing 211 the rim may involve the mounting spindle 164 (FIGS. 5 and 6) and the coupler 110 (FIGS. 1-4 and 7-10) as described above, but the mounting spindle and the coupler are by no means necessary to perform the method. For example, the mounting spindle could be considered optional in some embodiments, such as one where the outer drive shaft 144 (FIG. 5) is simply extended to project above the platen 158 (also FIG. 5) for a predetermined distance. As noted above, a number of alternative couplers or adaptors may be utilized to accomplish the clamping action when the drive shaft is retracted to generate the clamping action.

Additionally, the clamping and releasing steps 207 and 211 may each be performed with the drive shaft in the tire changing position, with the drive shaft in the wheel rim mounting position, or both.

The clamping and releasing steps 207 and 211 by moving the drive shaft toward and away from the machine base may be considered entirely optional in some embodiments. That is, in another embodiment, the drive shaft may be tiltable to different positions for loading of rims and for tire changing, but need not be extendable and retractable for clamping of the rim. Other clamping features and mechanisms may be provided if desired that do not involve extending and retracting of the drive shaft along the drive axis.

As also shown in FIG. 11, the method 200 may also include storing 216 a wheel rim mounting position in machine memory as described above after the wheel rim mounting is determined in step 204 by an operator. In a further and/or alternative embodiment, the machine 100 may be provided with a number of preset or predetermined wheel mounting positions in machine memory for selection by the operator. In any event, any stored wheel rim mounting position at step 216, if selected by an operator, may be retrieved 218 and automatically undertaken by the machine to automatically position the drive shaft at step 204 for use in a desired position. The machine may therefore repeatedly assume optimal wheel rim mounting positions that may be user-selected, without the user having to manually position the drive shaft to the desired position. Consequently, tire changing may be accomplished in less time and with less effort by an experienced operator familiar with the available stored mounting positions.

D. Conclusion

It is now believed that the benefits and advantages of the inventive concepts disclosed herein have been aptly demonstrated. Multiple embodiments of tire changing machines and associated methods have now been described which provide a more capable and more versatile machine and methodology that may be used more or less universally across a great variety of different rim and tire sizes. These and other advantages are achieved while reducing labor required by the machine operator and personnel to handle and lift the rims and tires. Furthermore, the above-described embodiments of tire changing machines and methodology avoid manufacturing and performance issues of some existing machines having more complicated centering, clamping and gripping features for engaging wheel rims. Cost advantages are also realized by avoiding more complicated clamping features and tire lift features of known machines.

While the invention has been described in terms of various specific embodiments, those skilled in the art will recognize that the invention can be practiced with modification within the spirit and scope of the claims.

What is claimed is:

1. A machine for changing a tire on a wheel rim, the machine comprising:
   a base;
   a drive shaft assembly having a proximal end proximate the base, a distal end extending outwardly from the base, and a longitudinal axis extending from the proximal end to the distal end;
   a motor coupled to the distal end of the drive shaft assembly for rotating the distal end of the drive shaft assembly about the longitudinal axis; and
   at least one pivot element directly coupled to the proximal end of the drive shaft assembly, and a rotary actuator element coupled to the at least one pivot element and operable to cause the proximal end of the drive shaft assembly to tilt relative to the base.

2. The machine of claim 1, wherein actuator element is operable to tilt the proximal end of the drive shaft assembly and position the distal end of the drive shaft assembly in each of a wheel rim mounting position at a first angle relative to the base and a tire changing position at a second angle relative to the base, wherein the first and second angles are different from one another.

3. The machine of claim 2, wherein the drive shaft assembly is oriented substantially vertically in the tire changing position, and the drive shaft is oriented substantially horizontally in the wheel mounting position.

4. The machine of claim 1, the wheel rim including a hub mount pad, the machine further comprising a platen fixed to the distal end of the drive shaft assembly, the platen sized and dimensioned to support the hub mount pad of the wheel rim.

5. The machine of claim 4, further comprising an anti-rotate pin projecting from the platen.

6. The machine of claim 1, further comprising a mounting spindle removably coupled to the distal end of the drive shaft assembly.

7. The machine of claim 6, the wheel rim including a hub mount pad, the machine further comprising an adaptor removably coupled to the spindle and engaging the hub mount pad of the wheel rim.

8. The machine of claim 7, wherein the distal end of the drive shaft assembly is retractable along the longitudinal axis relative to the proximal end of the drive shaft assembly and the hub mount pad to generate a clamping force in a direction parallel to the drive axis and secure the spindle to the hub mount pad in a stationary position with respect to the distal end of the drive shaft assembly.

9. The machine of claim 1, wherein at least one of the motor and the actuator element are hydraulically actuated.

10. The machine of claim 1, further comprising an angle sensor element detecting a tilted position of the actuator element, and a controller having a memory for storing at least one preferred tilted position.

11. The machine of claim 1, further comprising a mechanism configured to extend and retract the distal end of the drive shaft assembly relative to proximal end of the drive shaft assembly and the base in a direction parallel to the longitudinal axis to establish a clamped position securing the wheel rim to the distal end and a released position allowing the wheel rim to be disengaged from the distal end.

12. The machine of claim 1, wherein the motor is directly coupled to the proximal end of the drive shaft assembly.

13. The machine of claim 1, wherein the at least one pivot element comprises a pivot shaft.

14. A machine for changing a tire on a wheel rim, the machine comprising:
    a base;
    a drive shaft assembly having a proximal end proximate the base, a distal end extending outwardly from the base, and a longitudinal axis extending from the proximal end to the distal end, the proximal end including a pair of pivot shafts extending opposite one another; and
    a single actuator configured to cause the proximal end of the drive shaft assembly to tilt relative to the base upon the pair of pivot shafts and selectively position the drive shaft in a wheel rim mounting position and a tire changing position at respectively different angles relative to the base.

15. The machine of claim 14, the wheel rim including a hub mount pad, the machine further comprising a platen fixed to the distal end of the drive shaft assembly, the platen sized and dimensioned to support the hub mount pad of the wheel rim.

16. The machine of claim 15, further comprising a removable mounting spindle coupled to the distal end of the drive shaft assembly.

17. The machine of claim 16, the machine further comprising an adaptor removably coupled to the spindle and engaging the hub mount pad of the wheel rim opposite the platen.

18. The machine of claim 14, the wheel rim including a hub mount pad, and wherein the distal end of the drive shaft assembly is retractable relative to the proximal end of the drive shaft assembly in a direction parallel to the longitudinal axis to generate an axially directed clamping force to maintain the hub mount pad stationary with respect to the drive distal end of the drive shaft assembly.

19. The machine of claim 14, further comprising an angle sensor element and a memory, wherein the angle sensor element detects a tilted position of the drive assembly, and wherein a detected tilted position may be stored in the memory and retrieved for later use to position the drive shaft assembly at the stored position.

20. The machine of claim 19, further comprising a controller associated with the angle sensor element and the memory, wherein a plurality of preferred mounting positions for respective wheel rims are stored in the memory, and the controller is configured to execute the plurality of preferred mounting positions as selected by an operator of the machine.

21. The machine of claim 19, further comprising an input/output element configured to accept a selected one of the preferred mounting positions from the operator of the machine.

* * * * *